United States Patent
Ikarashi (10) Patent No.: US 11,611,368 B2
(45) Date of Patent: Mar. 21, 2023

(54) RADIO-FREQUENCY SIGNAL RECEIVER/TRANSMITTER CIRCUIT

(71) Applicant: Murata Manufacturing Co., Ltd., Kyoto (JP)

(72) Inventor: Kazuhiro Ikarashi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/453,050

(22) Filed: Nov. 1, 2021

(65) Prior Publication Data

US 2022/0140856 A1   May 5, 2022

(30) Foreign Application Priority Data

Nov. 2, 2020 (JP) .............................. JP2020-183901

(51) Int. Cl.
*H04B 1/44* (2006.01)
*H04L 5/14* (2006.01)

(52) U.S. Cl.
CPC ...... *H04B 1/44* (2013.01); *H04L 5/14* (2013.01)

(58) Field of Classification Search
CPC ................ H04B 1/40; H04B 1/44; H04L 5/14
See application file for complete search history.

(56) References Cited

U.S. PATENT DOCUMENTS

| 10,659,086 | B2 | 5/2020 | Khlat | |
| 2021/0104996 | A1* | 4/2021 | Mori | ................... H03H 7/1783 |
| 2021/0313962 | A1* | 10/2021 | Sugaya | ................... H03H 9/542 |
| 2021/0336640 | A1* | 10/2021 | Nakajima | ................ H03F 3/195 |
| 2021/0384924 | A1* | 12/2021 | Nakamura | .......... H03H 9/02574 |
| 2022/0094310 | A1* | 3/2022 | Medra | ....................... H03F 3/19 |
| 2022/0231752 | A1* | 7/2022 | Chakraborty | ........ H04B 7/0608 |

FOREIGN PATENT DOCUMENTS

| JP | 2006-197368 A | 7/2006 |
| JP | 2011-135363 A | 7/2011 |
| JP | 2014-123901 A | 7/2014 |

* cited by examiner

*Primary Examiner* — Thanh C Le
(74) *Attorney, Agent, or Firm* — Pearne & Gordon LLP (57) ABSTRACT

A radio-frequency signal receiver/transmitter circuit includes a power amplifying circuit that amplifies a radio-frequency transmit signal for output, at least one duplexer including a transmit filter for passing the radio-frequency transmit signal and a receive filter for passing a radio-frequency receive signal, a switch that electrically connects between the power amplifying circuit and the transmit filter, and a control circuit that controls enabling/disabling the power amplifying circuit, that controls connection of the switch, and that controls switching the receive filter between first bandpass characteristics and second bandpass characteristics. The receive filter switches between the first bandpass characteristics and the second bandpass characteristics, in which attenuation is relatively less than that in the first bandpass characteristics. The control circuit exerts such control that the receive filter in the duplexer, including the transmit filter through which the radio-frequency transmit signal does not pass, changes to the second bandpass characteristics.

10 Claims, 9 Drawing Sheets

| POWER AMPLIFYING CIRCUIT PA | SWITCH SW-1 | RECEIVE FILTER $4_R$ | |
|---|---|---|---|
| ON | ON | OFF | ←151 |
| OFF | ON | ON | ←152 |
| ON | OFF | ON | ←153 |
| OFF | OFF | ON | ←154 |

RADIO-FREQUENCY SIGNAL RECEIVER/TRANSMITTER CIRCUIT

CROSS REFERENCE TO RELATED APPLICATION

This application claims priority from Japanese Patent Application No. 2020-183901 filed on Nov. 2, 2020. The content of this application is incorporated herein by reference in its entirety.

BACKGROUND

The present disclosure relates to a radio-frequency signal receiver/transmitter circuit.

Japanese Unexamined Patent Application Publication No. 2011-135363 describes a portable communication terminal including a controller. In reception of a signal in a second frequency band which is performed by a first reception processor, when a first transmission processor transmits a signal in a first frequency band, the controller exerts control so that the suppression function of a filter unit is enabled; when the first transmission processor does not transmit a signal in the first frequency band, the controller exerts control so that the suppression function of the filter unit is disabled.

U.S. patent Ser. No. 10/659,086 is another example of the related art.

Typically, in frequency division duplex (FDD), transmission and reception are performed simultaneously in a single band. However, in downlink carrier aggregation (DL CA), bands, in which only reception, not transmission, is performed, are used.

Filters, which are used, not in transmission, only in reception, desirably cause the attenuation of radio-frequency receive signals to be reduced.

BRIEF SUMMARY

The present disclosure provides a technique which achieves reduction of the attenuation of radio-frequency receive signals.

A radio-frequency signal receiver/transmitter circuit according to embodiments of the present disclosure includes a power amplifying circuit, at least one duplexer, a switch, and a control circuit. The power amplifying circuit amplifies a radio-frequency transmit signal for output. The at least one duplexer includes a transmit filter and a receive filter. The transmit filter causes the radio-frequency transmit signal to pass through. The receive filter is capable of switching between first bandpass characteristics and second bandpass characteristics, and causes a radio-frequency receive signal to pass through. The second bandpass characteristics are characteristics in which attenuation is relatively less than that in the first bandpass characteristics. The switch electrically connects between the power amplifying circuit and the transmit filter. The control circuit controls whether the power amplifying circuit is to perform amplification, controls connection of the switch, and controls whether the receive filter is to change to the first bandpass characteristics or the second bandpass characteristics. The control circuit exerts such control that the receive filter in the at least one duplexer, including the transmit filter through which the radio-frequency transmit signal does not pass, changes to the second bandpass characteristics.

Other features, elements, characteristics and advantages of the present disclosure will become more apparent from the following detailed description of embodiments of the present disclosure with reference to the attached drawings.

DETAILED DESCRIPTION

Embodiments of a radio-frequency signal receiver/transmitter circuit provided by the present disclosure will be described in detail below on the basis of the drawings. The present disclosure is not limited by the embodiments. Needless to say, the embodiments are exemplary, and partial replacement or combination of configurations described in different embodiments may be made. In a second embodiment, points common to those in a first embodiment will not be described, and only different points will be described. In particular, substantially the same operational effect caused by substantially the same configuration will not be described in the second embodiment.

First Embodiment

Circuit Configuration

Figure 1:
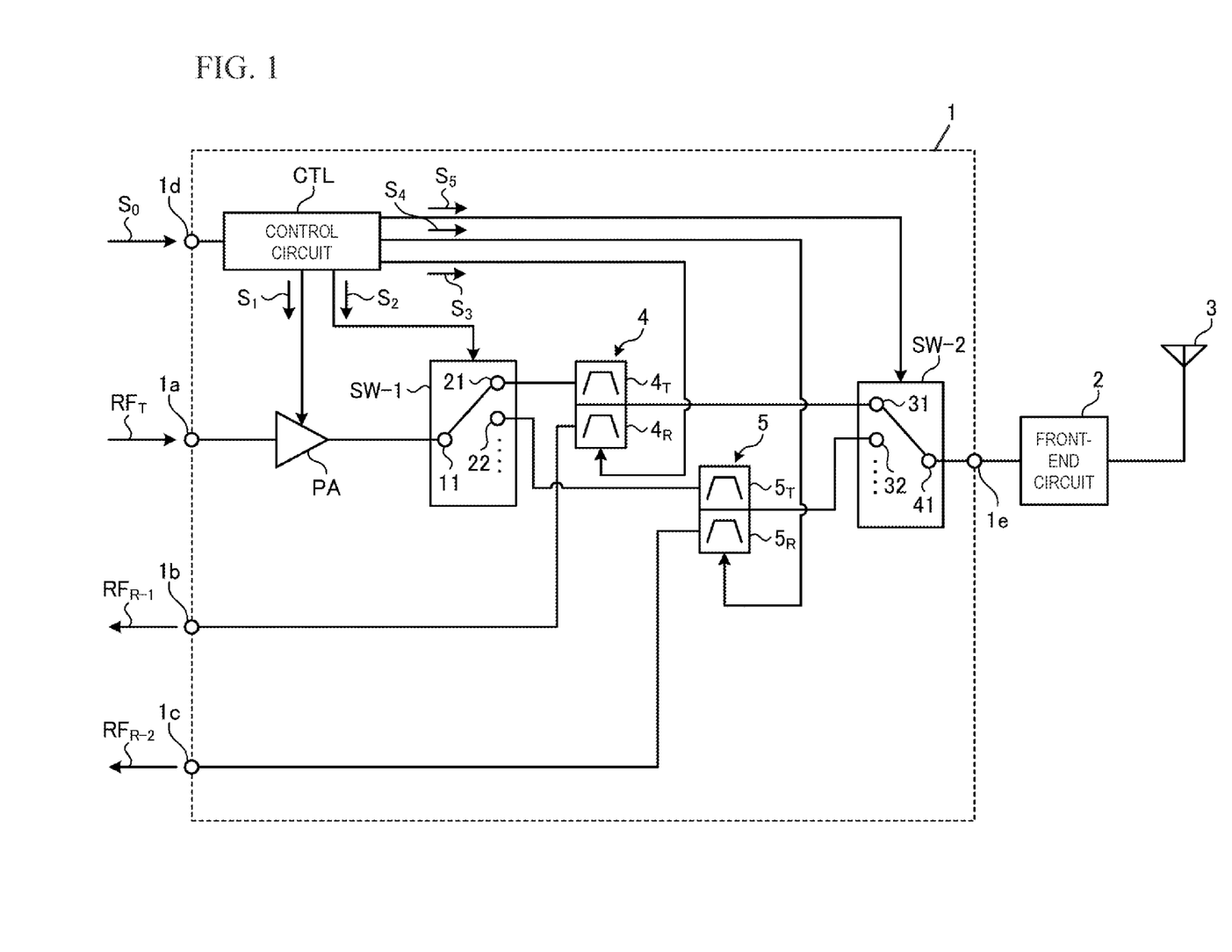
FIG. 1 is a diagram illustrating the configuration of a radio-frequency signal receiver/transmitter circuit according to a first embodiment.

FIG. 1 is a diagram illustrating the configuration of a radio-frequency signal receiver/transmitter circuit according to the first embodiment. A radio-frequency signal receiver/transmitter circuit 1 is a radio-frequency signal receiver/transmitter module in a mobile communication device such as a cellular phone device. The radio-frequency signal receiver/transmitter module is capable of outputting radio-frequency transmit signals through a front-end circuit 2 to an antenna 3, and is capable of receiving radio-frequency receive signals through the antenna 3 from the front-end circuit 2. The radio-frequency signal receiver/transmitter module may be formed of one or more components mounted on a substrate.

The frequencies of the radio-frequency transmit signals and the radio-frequency receive signals ranges, for example, from several hundred megahertz (MHz) to several tens gigahertz (GHz). However, the present disclosure is not limited to this.

The radio-frequency signal receiver/transmitter circuit 1 operates by using frequency division duplex (FDD). However, the present disclosure is not limited to this. The radio-frequency signal receiver/transmitter circuit 1 may operate by using time division duplex (TDD).

In the first embodiment, the number of antennas is one. However, the present disclosure is not limited to this. Two or more antennas may be used.

The radio-frequency signal receiver/transmitter circuit 1 includes a power amplifying circuit PA, switches SW-1 and SW-2, duplexers 4 and 5, and a control circuit CTL.

In the first embodiment, the number of power amplifying circuits is one. However, the present disclosure is not limited to this. Two or more power amplifying circuits may be used. In the first embodiment, the number of duplexers is two. However, the present disclosure is not limited to this. A single duplexer may be used, or three or more duplexers may be used.

The duplexer 4 includes a transmit filter $4_T$, which passes a radio-frequency transmit signal $RF_T$, and a receive filter $4_R$, which passes a radio-frequency receive signal $RF_{R-1}$. The duplexer 5 includes a transmit filter $5_T$, which passes the radio-frequency transmit signal $RF_T$, and a receive filter $5_R$, which passes a radio-frequency receive signal $RF_{R-2}$.

In the first embodiment, each of the transmit filter $4_T$, the receive filter $4_R$, the transmit filter $5_T$, and the receive filter $5_R$ is a band pass filter. However, the present disclosure is not limited to this. Each of the transmit filter $4_T$, the receive filter $4_R$, the transmit filter $5_T$, and the receive filter $5_R$ may be a low pass filter, a high pass filter, or a notch filter (band-stop filter).

The configuration of each of the duplexers 4 and 5, which includes one transmit filter and one receive filter, is not limiting. For example, each of the duplexers 4 and 5 may include multiple transmit filters or may include multiple receive filters. The numbers of types of filters included in each of the duplexers 4 and 5 (the number of transmit filters and the number of receive filters) are not limiting. Any configuration may be employed as long as the duplexers 4 and 5 include at least one transmit filter and at least one receive filter as a whole.

The frequencies of a radio-frequency transmit signal and a radio-frequency receive signal passed by each of the duplexers 4 and 5 may be different from each other or may be the same.

The switch SW-1 includes a first terminal 11 and second terminals 21, 22, etc. When two or more power amplifying circuits are used, the switch SW-1 includes two or more first terminals.

The switch SW-2 includes first terminals 31, 32, etc., and a second terminal 41.

The first terminal 11 of the switch SW-1 is electrically connected to the output terminal of the power amplifying circuit PA. The second terminal 21 of the switch SW-1 is electrically connected a first end of the transmit filter $4_T$. The second terminal 22 of the switch SW-1 is electrically connected to a first end of the transmit filter $5_T$.

The receive filter $4_R$ is electrically connected, at its first end, to an output terminal $1b$. The transmit filter $4_T$ and the receive filter $4_R$ are electrically connected, at their second ends, to the first terminal 31 of the switch SW-2.

The receive filter $5_R$ is electrically connected, at its first end, to an output terminal $1c$. The transmit filter $5_T$ and the receive filter $5_R$ are electrically connected, at their second ends, to the first terminal 32 of the switch SW-2.

The second terminal 41 of the switch SW-2 is electrically connected to the front-end circuit 2 through an input/output terminal $1e$.

The control circuit CTL receives a control signal $S_0$ through an input terminal $1d$. In accordance with the control signal $S_0$, the control circuit CTL outputs, for control, control signals $S_1$ to $S_5$ to the power amplifying circuit PA, the switch SW-1, the receive filter $4_R$, the receive filter $5_R$, and the switch SW-2, respectively. The control signals $S_0$ to $S_5$ may be one-bit-width or multiple-bit-width digital signals or may be analog signals (currents or voltages).

Figure 2:
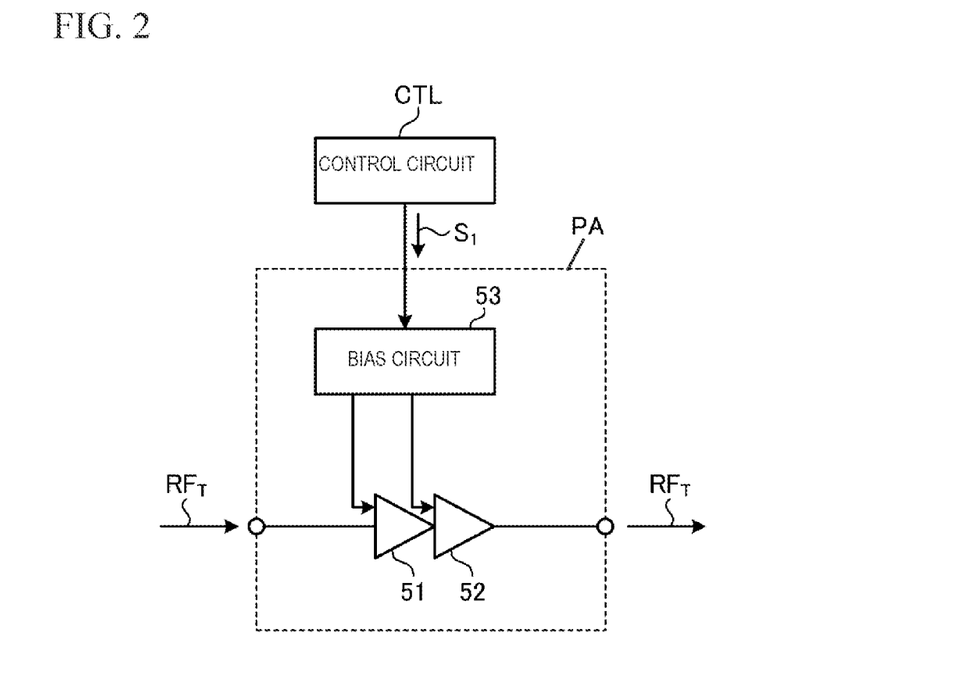
FIG. 2 is a diagram illustrating an exemplary configuration of a power amplifying circuit of a radio-frequency signal receiver/transmitter circuit according to the first embodiment.

FIG. 2 is a diagram illustrating an exemplary configuration of the power amplifying circuit of the radio-frequency signal receiver/transmitter circuit according to the first embodiment.

The power amplifying circuit PA, having the exemplary configuration illustrated in FIG. 2, includes amplifiers 51 and 52, which form a two-stage amplifier, and a bias circuit 53. In the first embodiment, the power amplifying circuit PA includes a two-stage amplifier. However, the present disclosure is not limited to this. The power amplifying circuit PA may include a single-stage amplifier or may include a three-or-more-stage amplifier. The exemplary configuration includes a single bias circuit 53. Alternatively, multiple bias circuits, whose number matches the number of amplifier stages, may be included.

When the control circuit CTL is to make the power amplifying circuit PA amplify power, the control circuit CTL outputs, to the bias circuit 53, a bias current serving as the control signal $S_1$. When the bias circuit 53 receives a bias current from the control circuit CTL, the bias circuit 53 outputs bias currents to the amplifiers 51 and 52. Thus, the amplifiers 51 and 52 amplify the radio-frequency transmit signal $RF_T$. When the control circuit CTL is not to make the power amplifying circuit PA amplify power, the control circuit CTL does not output, to the bias circuit 53, a bias current serving as the control signal $S_1$. When the bias circuit 53 does not receive a bias current from the control circuit CTL, the bias circuit 53 does not output bias currents to the amplifiers 51 and 52. Thus, the amplifiers 51 and 52 do not amplify the radio-frequency transmit signal $RF_T$.

Figure 3:
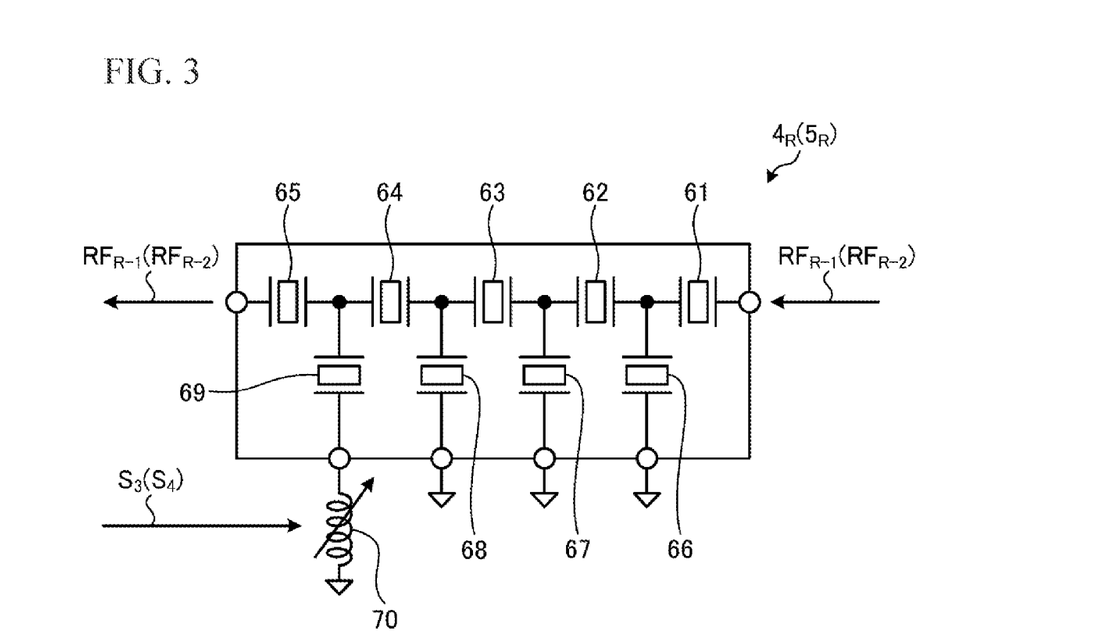
FIG. 3 is a diagram illustrating an exemplary configuration of a receive filter of a radio-frequency signal receiver/transmitter circuit according to the first embodiment.
Figure 4:
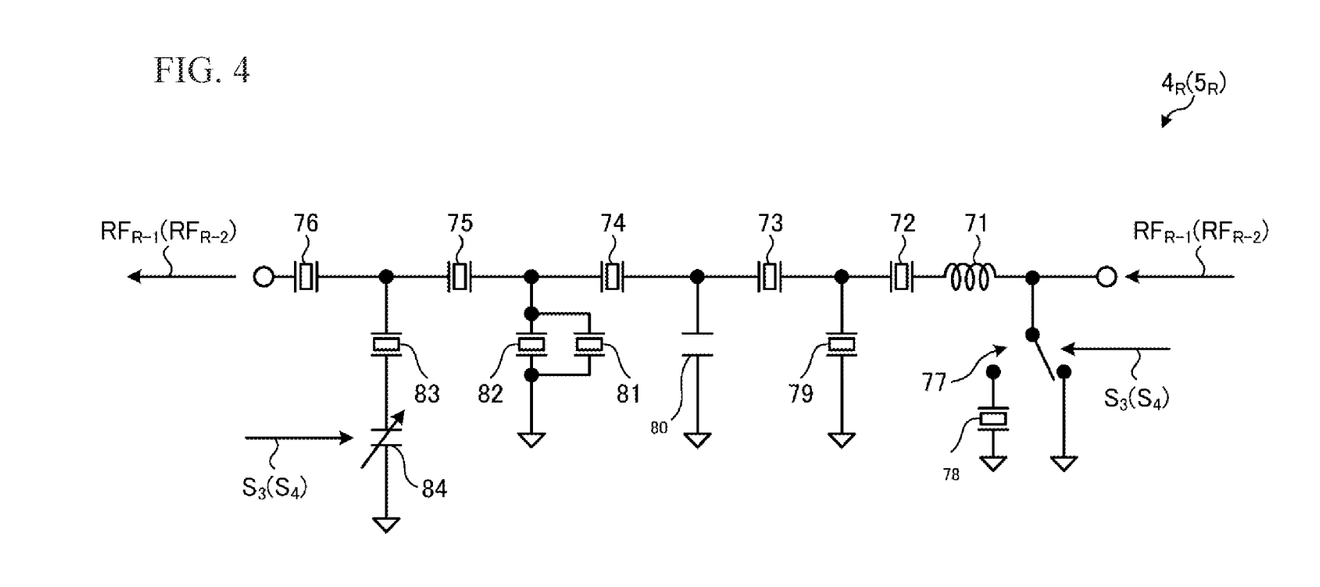
FIG. 4 is a diagram illustrating an exemplary configuration of a receive filter of a radio-frequency signal receiver/transmitter circuit according to the first embodiment.
Figure 5:
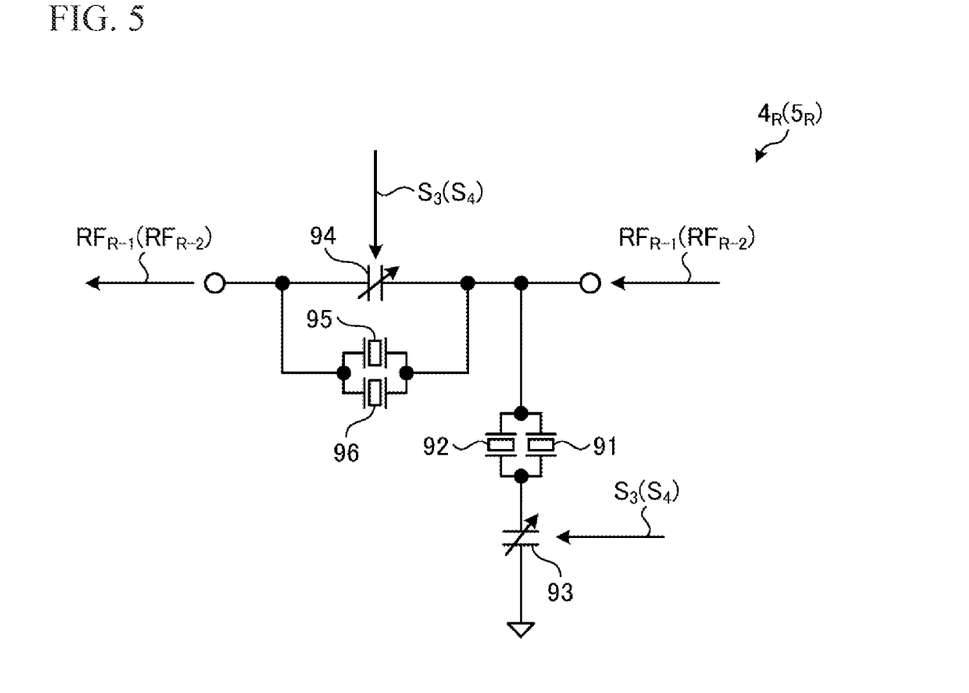
FIG. 5 is a diagram illustrating an exemplary configuration of a receive filter of a radio-frequency signal receiver/transmitter circuit according to the first embodiment.

FIGS. 3 to 5 are diagrams illustrating exemplary configurations of a receive filter of the radio-frequency signal receiver/transmitter circuit according to the first embodiment. An exemplary configuration of the receive filter $5_R$ is substantially the same as that of the receive filter $4_R$, and thus will not be illustrated and described.

Referring to FIG. 3, the receive filter $4_R$ according to a first exemplary configuration includes resonators 61 to 69 and a variable inductor 70. The variable inductor 70 has an inductance value changeable by switching between connection and disconnection between multiple inductors.

The resonator 61 receives, at its first end, the radio-frequency receive signal $RF_{R-1}$ received by the antenna 3. The resonator 61 is electrically connected, at its second end, to a first end of the resonator 62 and a first end of the resonator 66. The resonator 66 is electrically connected, at its second end, to the reference potential.

The resonator 62 is electrically connected, at its second end, to a first end of the resonator 63 and a first end of the resonator 67. The resonator 67 is electrically connected, at its second end, to the reference potential.

The resonator 63 is electrically connected, at its second end, to a first end of the resonator 64 and a first end of the resonator 68. The resonator 68 is electrically connected, at its second end, to the reference potential.

The resonator 64 is electrically connected, at its second end, to a first end of the resonator 65 and a first end of the resonator 69. The resonator 65 outputs, from its second end, the radio-frequency receive signal $RF_{R-1}$. The resonator 69 is electrically connected, at its second end, to a first end of the variable inductor 70. The variable inductor 70 is electrically connected, at its second end, to the reference potential. The variable inductor 70 changes its inductance value in accordance with the control signal $S_3$ received from the control circuit CTL.

The receive filter $4_R$ changes the inductance value of the variable inductor 70 in accordance with the control signal $S_3$, thus enabling the bandpass characteristics (attenuation characteristics, frequency characteristics) to be changed.

Referring to FIG. 4, the receive filter $4_R$ according to a second exemplary configuration includes an inductor 71, resonators 72 to 76, 78, 79, 81, 82, and 83, a switch 77, a capacitor 80, and a variable capacitor 84. The variable capacitor 84 has an electrostatic capacity value changeable by switching between connection and disconnection between multiple capacitors.

The inductor 71 receives, at its first end, the radio-frequency receive signal $RF_{R-1}$ received by the antenna 3. The inductor 71 is electrically connected, at its second end, to a first end of the resonator 72. The switch 77 electrically connects between the first end of the inductor 71 and the reference potential or between the first end of the inductor 71 and a first end of the resonator 78 in accordance with the control signal $S_3$ received from the control circuit CTL. The resonator 78 is electrically connected, at its second end, to the reference potential.

The resonator 72 is electrically connected, at its second end, to a first end of the resonator 73 and a first end of the resonator 79. The resonator 79 is electrically connected, at its second end, to the reference potential.

The resonator 73 is electrically connected, at its second end, to a first end of the resonator 74 and a first end of the capacitor 80. The capacitor 80 is electrically connected, at its second end, to the reference potential.

The resonator 74 is electrically connected, at its second end, to a first end of the resonator 75, a first end of the resonator 81, and a first end of the resonator 82. The resonator 81 and the resonator 82 are electrically connected, at their second ends, to the reference potential.

The resonator 75 is electrically connected, at its second end, to a first end of the resonator 76 and a first end of the resonator 83. The resonator 83 is electrically connected, at its second end, to a first end of the variable capacitor 84. The variable capacitor 84 is electrically connected, at its second end, to the reference potential. The variable capacitor 84 changes its electrostatic capacity value in accordance with the control signal $S_3$ received from the control circuit CTL.

The resonator 76 outputs, from its second end, the radio-frequency receive signal $RF_{R-1}$.

The receive filter $4_R$ changes the connection state of the switch 77 and the electrostatic capacity value of the variable capacitor 84 in accordance with the control signal $S_3$, thus enabling the bandpass characteristics (attenuation characteristics, frequency characteristics) to be changed.

Referring to FIG. 5, the receive filter $4_R$ according to a third exemplary configuration includes resonators 91, 92, 95, and 96 and variable capacitors 93 and 94.

The variable capacitor 94, the resonator 95, and the resonator 96 receive, at their first ends, the radio-frequency receive signal $RF_{R-1}$ received by the antenna 3. The variable capacitor 94 changes its electrostatic capacity value in accordance with the control signal $S_3$ received from the control circuit CTL.

The resonator 91 and the resonator 92 are electrically connected, at their first ends, to the first end of the variable capacitor 94, the first end of the resonator 95, and the first end of the resonator 96. The resonator 91 and the resonator 92 are electrically connected, at their second ends, to a first end of the variable capacitor 93. The variable capacitor 93 is electrically connected, at its second end, to the reference potential. The variable capacitor 93 changes its electrostatic capacity value in accordance with the control signal $S_3$ received from the control circuit CTL.

The variable capacitor 94, the resonator 95, and the resonator 96 output, from their second ends, the radio-frequency receive signal $RF_{R-1}$.

The receive filter $4_R$ changes the electrostatic capacity values of the variable capacitors 93 and 94 in accordance with the control signal $S_3$, thus enabling the bandpass characteristics (attenuation characteristics, frequency characteristics) to be changed.

The Basic Operation of the Radio-Frequency Signal Receiver/Transmitter Circuit

Referring to FIG. 1 again, the power amplifying circuit PA receives the radio-frequency transmit signal $RF_T$ through an input terminal 1a. The power amplifying circuit PA amplifies the radio-frequency transmit signal $RF_T$ in accordance with the control signal $S_1$, and outputs the amplified signal to the first terminal 11 of the switch SW-1.

The switch SW-1 electrically connects between the first terminal 11 and the second terminal 21 or between the first terminal 11 and the second terminal 22 in accordance with the control signal $S_2$. FIG. 1 illustrates the state of the switch SW-1 electrically connecting between the first terminal 11 and the second terminal 21.

The switch SW-2 electrically connects between the first terminal 31 and the second terminal 41 or between the first terminal 32 and the second terminal 41 in accordance with the control signal $S_5$. FIG. 1 illustrates the state of the switch SW-2 electrically connecting between the first terminal 31 and the second terminal 41.

In the example illustrated in FIG. 1, the radio-frequency transmit signal $RF_T$, which has been amplified by the power amplifying circuit PA, is transmitted through the first terminal 11 and the second terminal 21 to be band-passed by the transmit filter $4_T$, and is transmitted to the front-end circuit 2 through the first terminal 31 and the second terminal 41.

In contrast, assume the following case which is different from the example illustrated in FIG. 1: the switch SW-1 electrically connects between the first terminal 11 and the second terminal 22; and the switch SW-2 electrically connects between the first terminal 32 and the second terminal 41. In this case, the radio-frequency transmit signal $RF_T$, which has been amplified by the power amplifying circuit PA, is transmitted through the first terminal 11 and the second terminal 22 to be band-passed by the transmit filter $5_T$, and is transmitted to the front-end circuit 2 through the first terminal 32 and the second terminal 41.

In the example illustrated in FIG. 1, the radio-frequency receive signal $RF_{R-1}$, which is received from the front-end circuit 2, is transmitted through the second terminal 41 and the first terminal 31 to be band-passed by the receive filter $4_R$, and is output from the output terminal 1b.

In contrast, assume the following case which is different from the example illustrated in FIG. 1: the switch SW-2 electrically connects between the first terminal 32 and the second terminal 41. In this case, the radio-frequency receive signal $RF_{R-2}$, which is received from the front-end circuit 2, is transmitted through the second terminal 41 and the first terminal 32 to be band-passed by the receive filter $5_R$, and is output from the output terminal 1c.

Specific Operations of the Radio-Frequency Signal Receiver/Transmitter Circuit

Typically, in FDD, transmission and reception are performed simultaneously in a single band. However, a band, in which only reception, not transmission, is performed, is used in downlink carrier aggregation (DL CA).

Figure 6A:
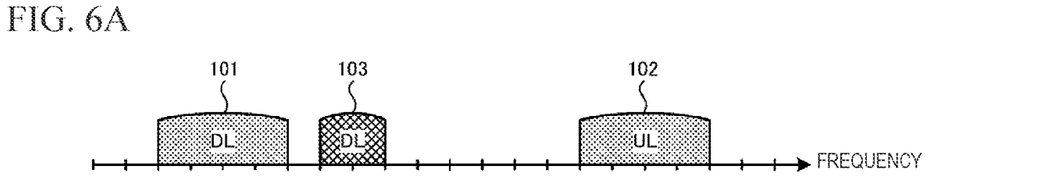
FIGS. 6A to 6C are diagrams illustrating uplink (UL) frequency bands and downlink (DL) frequency bands in carrier aggregation (CA)
Figure 6B:
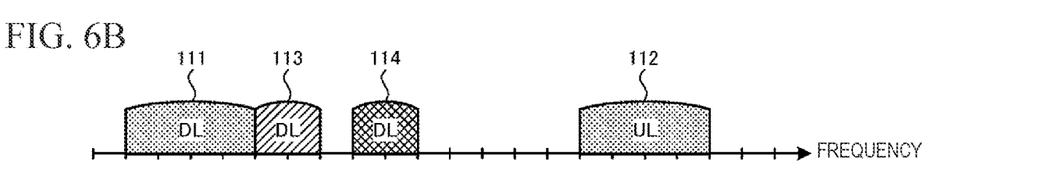
Figure 6C:
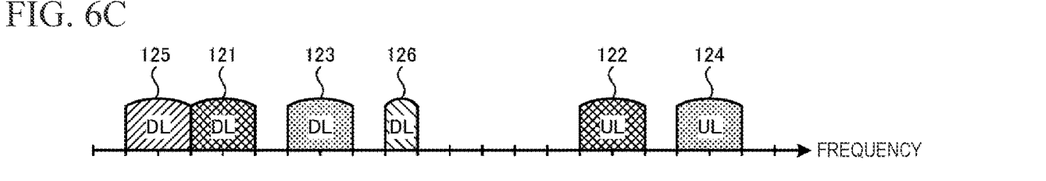

FIGS. 6A to 6C are diagrams illustrating uplink (UL) frequency bands and DL frequency bands in CA. Specifically, FIG. 6A is a diagram illustrating frequency bands in 2 DL CA. FIG. 6B is a diagram illustrating frequency bands in 3 DL CA. FIG. 6C is a diagram illustrating frequency bands in 4 DL CA.

Referring to FIG. 6A, a frequency band 101 is a DL frequency band of a first band. A frequency band 102 is a UL frequency band of the first band. A frequency band 103 is a DL frequency band of a second band. In the example in FIG. 6A, the first band is a band in which both transmission and reception are performed; the second band is a band in which only reception, not transmission, is performed.

Referring to FIG. 6B, a frequency band 111 is a DL frequency band of a first band. A frequency band 112 is a UL frequency band of the first band. A frequency band 113 is a DL frequency band of a second band. A frequency band 114 is a DL frequency band of a third band. In the example in FIG. 6B, the first band is a band in which both transmission and reception are performed; the second and third bands are bands in which only reception, not transmission, is performed.

Referring to FIG. 6C, a frequency band 121 is a DL frequency band of a first band. A frequency band 122 is a UL frequency band of the first band. A frequency band 123 is a DL frequency band of a second band. A frequency band 124 is a UL frequency band of the second band. A frequency band 125 is a DL frequency band of a third band. A frequency band 126 is a DL frequency band of a fourth band. In the example in FIG. 6C, the first and second bands are bands in which both transmission and reception are performed; the third and fourth bands are bands in which only reception, not transmission, is performed.

The second end of the transmit filter $4_T$ is electrically connected to the second end of the receive filter $4_R$. Therefore, when the radio-frequency transmit signal $RF_T$ passes through the transmit filter $4_T$ (when transmission is performed), the receive filter $4_R$ needs to attenuate (suppress) the radio-frequency transmit signal $RF_T$. Similarly, when the radio-frequency transmit signal $RF_T$ passes through the transmit filter $5_T$, the receive filter $5_R$ needs to attenuate (suppress) the radio-frequency transmit signal $RF_T$.

In contrast, when the radio-frequency transmit signal $RF_T$ does not pass through the transmit filter $4_T$ (when transmission is not performed), the receive filter $4_R$ does not need to attenuate (suppress) the radio-frequency transmit signal $RF_T$. Similarly, when the radio-frequency transmit signal $RF_T$ does not pass through the transmit filter $5_T$, the receive filter $5_R$ does not need to attenuate (suppress) the radio-frequency transmit signal $RF_T$.

Therefore, when the radio-frequency transmit signal $RF_T$ passes through the transmit filter $4_T$, the receive filter $4_R$ changes to first bandpass characteristics (first attenuation characteristics, first frequency characteristics) in accordance with the control signal $S_3$. Similarly, when the radio-frequency transmit signal $RF_T$ passes through the transmit filter $5_T$, the receive filter $5_R$ changes to the first bandpass characteristics (first attenuation characteristics, first frequency characteristics) in accordance with the control signal $S_4$.

In contrast, when the radio-frequency transmit signal $RF_T$ does not pass through the transmit filter $4_T$, the receive filter $4_R$ changes to second bandpass characteristics (second attenuation characteristics, second frequency characteristics), in which the attenuation is relatively less than that in the first bandpass characteristics, in accordance with the control signal $S_3$. Similarly, when the radio-frequency transmit signal $RF_T$ does not pass through the transmit filter $5_T$, the receive filter $5_R$ changes to the second bandpass characteristics (second attenuation characteristics, second frequency characteristics), in which the attenuation is relatively less than that in the first bandpass characteristics, in accordance with the control signal $S_4$.

In the first exemplary configuration of a receive filter illustrated in FIG. 3, the receive filters $4_R$ and $5_R$ change the inductance value of the variable inductor 70 in accordance with the control signals $S_3$ and $S_4$, respectively, thus switching between the first bandpass characteristics and the second bandpass characteristics. In the second exemplary configuration of a receive filter illustrated in FIG. 4, the receive filters $4_R$ and $5_R$ change the connection state of the switch 77 and the electrostatic capacity value of the variable capacitor 84 in accordance with the control signals $S_3$ and $S_4$, respectively, thus switching between the first bandpass characteristics and the second bandpass characteristics. In the third exemplary configuration of a receive filter illustrated in FIG. 5, the receive filters $4_R$ and $5_R$ change the electrostatic capacity values of the variable capacitors 93 and 94 in accordance with the control signals $S_3$ and $S_4$, respectively, thus switching between the first bandpass characteristics and the second bandpass characteristics.

Figure 7:
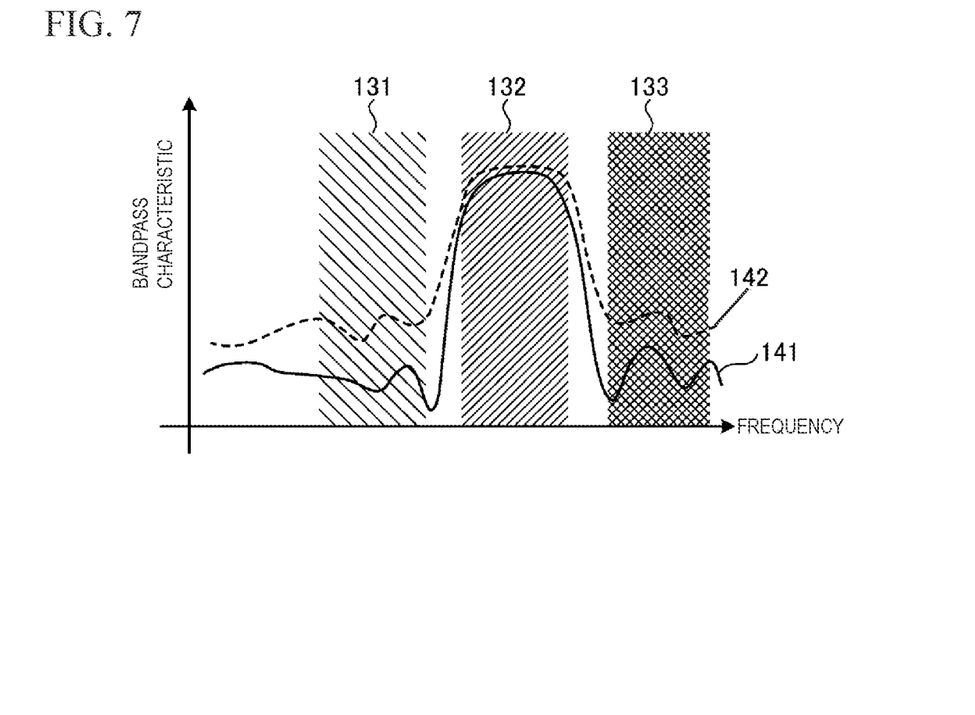
FIG. 7 is a diagram illustrating exemplary bandpass characteristics of a receive filter according to the first embodiment.

FIG. 7 is a diagram illustrating exemplary bandpass characteristics of a receive filter according to the first embodiment.

In FIG. 7, a frequency band 131 is a UL frequency band of a first band. A frequency band 132 is a DL frequency band of the first band. A frequency band 133 is a UL frequency band of a second band.

When the radio-frequency transmit signal $RF_T$ passes through the transmit filter $4_T$, the receive filter $4_R$ changes to the first bandpass characteristics in accordance with the control signal $S_3$. As illustrated by using a waveform 141, the frequency band 131 (and the frequency band 133) is attenuated (suppressed) by a large extent. In this case, the frequency band 132 is attenuated (suppressed) slightly. This discussion for the receive filter $4_R$ applies to the receive filter $5_R$.

In contrast, when the radio-frequency transmit signal $RF_T$ does not pass through the transmit filter $4_T$, the receive filter $4_R$ changes to the second bandpass characteristics in accordance with the control signal $S_3$. As illustrated by using a waveform 142, the attenuation (suppression amount) in the frequency band 131 (and the frequency band 133) is reduced. In this case, the attenuation (suppression amount) in the frequency band 132 of the waveform 142 is less than that of the waveform 141. This discussion for the receive filter $4_R$ applies to the receive filter $5_R$.

Thus, when the radio-frequency transmit signal $RF_T$ does not pass through the transmit filters $4_T$ and $5_T$, the receive filters $4_R$ and $5_R$ change to the second bandpass characteristics in accordance with the control signal $S_3$ and $S_4$, respectively. As illustrated by using the waveform 142, the attenuation (suppression amount) in the frequency band 132 may be reduced. Therefore, the radio-frequency signal receiver/transmitter circuit 1 may improve the signal level of the radio-frequency receive signals $RF_{R-1}$ and $RF_{R-2}$. Thus, the radio-frequency signal receiver/transmitter circuit 1 may improve the receiver sensitivity of the radio-frequency receive signals $RF_{R-1}$ and $RF_{R-2}$.

Figure 8:
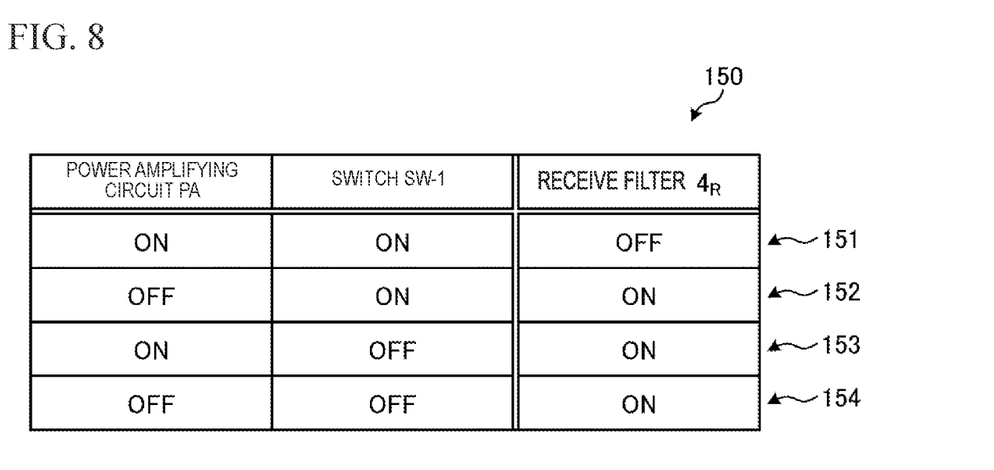
FIG. 8 is a diagram for describing operations of a control circuit of a radio-frequency signal receiver/transmitter circuit according to the first embodiment.

FIG. 8 is a diagram for describing operations of the control circuit of the radio-frequency signal receiver/transmitter circuit according to the first embodiment. Specifically, FIG. 8 is a diagram illustrating a truth-value table 150 which describes logic, according to which the control circuit CTL switches the receive filter $4_R$ between the first bandpass characteristics and the second bandpass characteristics. Logic, according to which the control circuit CTL switches the receive filter $5_R$ between the first bandpass characteristics and the second bandpass characteristics, is similar to the case for the receive filter $4_R$, and will not be illustrated and described.

In accordance with the control signal $S_0$, the control circuit CTL outputs the control signal $S_1$ to the power amplifying circuit PA, and controls whether or not the power amplifying circuit PA is to operate. In accordance with the control signal $S_0$, the control circuit CTL outputs the control signal $S_2$ to the switch SW-1, and controls the connection state of the switch SW-1. In accordance with the control signal $S_0$, the control circuit CTL outputs the control signal $S_3$ to the receive filter $4_R$, and switches the receive filter $4_R$ between the first bandpass characteristics and the second bandpass characteristics.

The first row 151 of the truth-value table 150 describes the case in which the control circuit CTL exerts control in accordance with the control signal $S_0$ as follows: the power amplifying circuit PA operates (ON); the switch SW-1 electrically connects the first terminal 11 to the second terminal 21 (ON). In this case, the radio-frequency transmit signal $RF_T$ passes through the transmit filter $4_T$. Therefore, in accordance with the control signal $S_0$, the control circuit CTL outputs the control signal $5_3$ to the receive filter $4_R$, and exerts control so that the receive filter $4_R$ changes to the first bandpass characteristics (OFF).

The second row 152 of the truth-value table 150 describes the case in which the control circuit CTL exerts control in accordance with the control signal $S_0$ as follows: the power amplifying circuit PA does not operate (OFF); the switch SW-1 electrically connects the first terminal 11 to the second terminal 21 (ON). In this case, the radio-frequency transmit signal $RF_T$ does not pass through the transmit filter $4_T$. Therefore, in accordance with the control signal $S_0$, the control circuit CTL outputs the control signal $S_3$ to the receive filter $4_R$, and exerts control so that the receive filter $4_R$ changes to the second bandpass characteristics (ON).

The third row 153 of the truth-value table 150 describes the case in which the control circuit CTL exerts control in accordance with the control signal $S_0$ as follows: the power amplifying circuit PA operates (ON); the switch SW-1 does not electrically connect the first terminal 11 to the second terminal 21 (OFF). In this case, the radio-frequency transmit signal $RF_T$ does not pass through the transmit filter $4_T$. Therefore, in accordance with the control signal $S_0$, the control circuit CTL outputs the control signal $S_3$ to the receive filter $4_R$, and exerts control so that the receive filter $4_R$ changes to the second bandpass characteristics (ON).

The fourth row 154 of the truth-value table 150 describes the case in which the control circuit CTL exerts control in accordance with the control signal $S_0$ as follows: the power amplifying circuit PA does not operate (OFF); the switch SW-1 does not electrically connect the first terminal 11 to the second terminal 21 (OFF). In this case, the radio-frequency transmit signal $RF_T$ does not pass through the transmit filter $4_T$. Therefore, in accordance with the control signal $S_0$, the control circuit CTL outputs the control signal $S_3$ to the receive filter $4_R$, and exerts control so that the receive filter $4_R$ changes to the second bandpass characteristics (ON).

Figure 9:
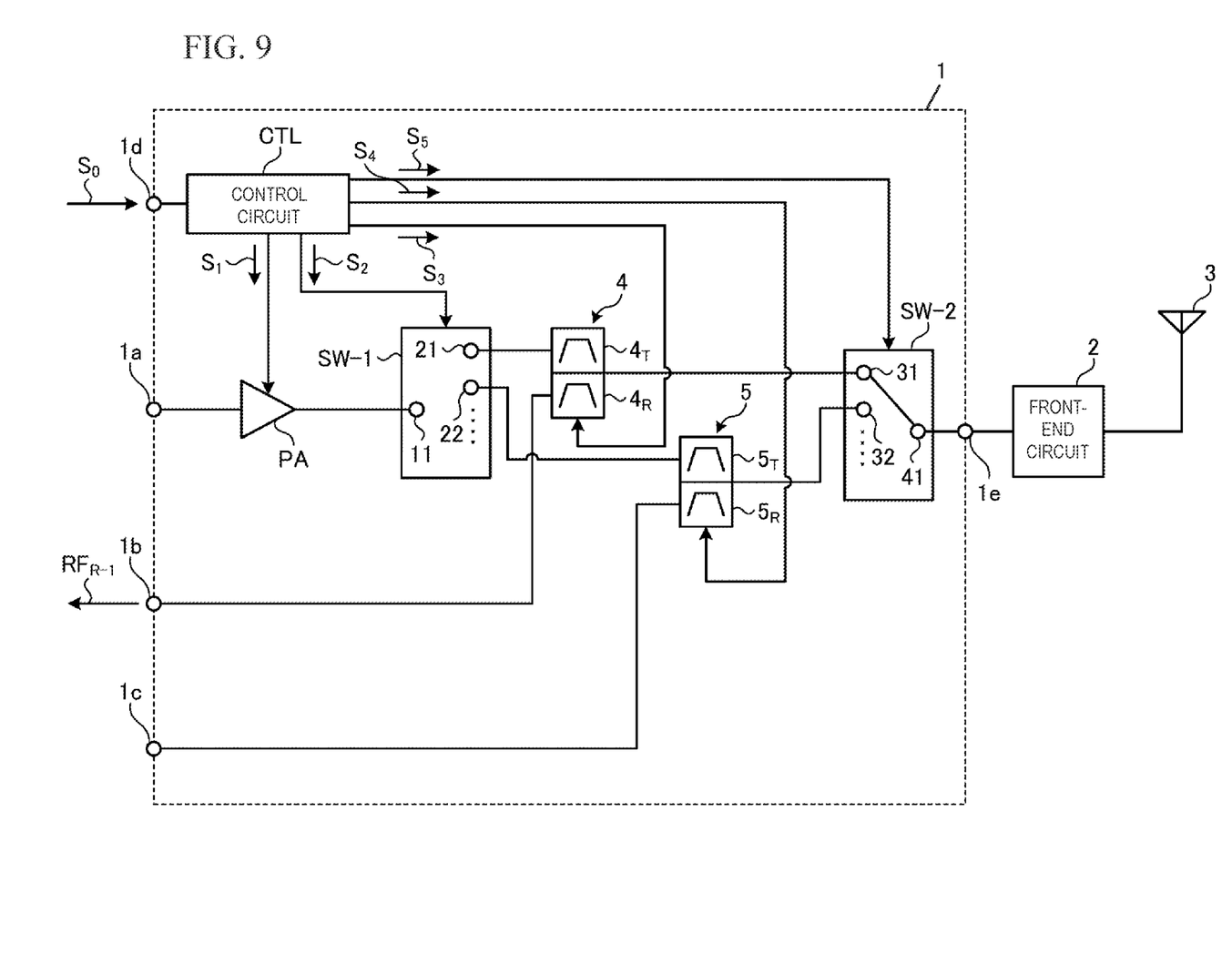
FIG. 9 is a diagram for describing a first exemplary operation of a radio-frequency signal receiver/transmitter circuit according to the first embodiment.

FIG. 9 is a diagram for describing a first exemplary operation of the radio-frequency signal receiver/transmitter circuit according to the first embodiment. FIG. 9 is a diagram illustrating the case in which a single band, in which only reception, not transmission, is performed, is used. In this case, in accordance with the control signal $S_0$, the control circuit CTL outputs the control signal $S_1$ to the power amplifying circuit PA, and exerts control so that the power amplifying circuit PA does not operate. In addition, in accordance with the control signal $S_0$, the control circuit CTL outputs the control signal $S_2$ to the switch SW-1, and controls the switch SW-1 so that the first terminal 11 is not electrically connected to the second terminal 21.

In this case, the radio-frequency transmit signal $RF_T$ does not pass through the transmit filter $4_T$. Therefore, in accordance with the control signal $S_0$, the control circuit CTL outputs the control signal $S_3$ to the receive filter $4_R$, and exerts control so that the receive filter $4_R$ changes to the second bandpass characteristics. The receive filter $4_R$ outputs the radio-frequency receive signal $RF_{R-1}$ from the output terminal 1b.

Figure 10:
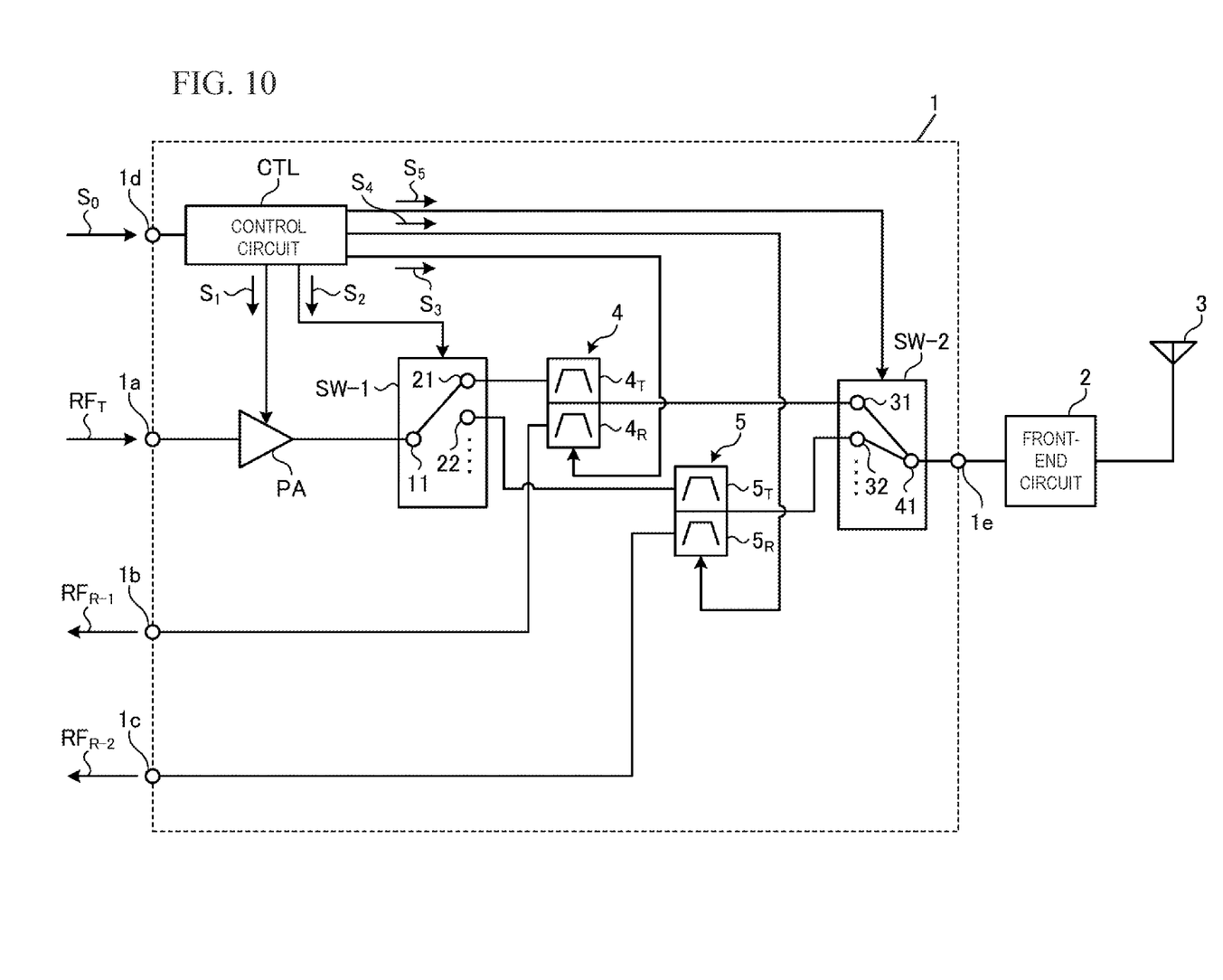
FIG. 10 is a diagram for describing a second exemplary operation of a radio-frequency signal receiver/transmitter circuit according to the first embodiment.

FIG. 10 is a diagram for describing a second exemplary operation of the radio-frequency signal receiver/transmitter circuit according to the first embodiment. FIG. 10 is a diagram illustrating an exemplary case of 2 DL CA. In this case, in accordance with the control signal $S_0$, the control circuit CTL outputs the control signal $S_1$ to the power amplifying circuit PA, and exerts control so that the power amplifying circuit PA operates. In addition, in accordance with the control signal $S_0$, the control circuit CTL outputs the control signal $S_2$ to the switch SW-1, and controls the switch SW-1 so that the first terminal 11 is electrically connected to the second terminal 21. Further, in accordance with the control signal $S_0$, the control circuit CTL outputs the control signal $S_5$ to the switch SW-2, and controls the switch SW-2 so that the first terminal 31 is electrically connected to the second terminal 41 and the first terminal 32 is electrically connected to the second terminal 41.

In this case, the radio-frequency transmit signal $RF_T$ passes through the transmit filter $4_T$, not through the transmit filter $5_T$. Therefore, in accordance with the control signal $S_0$, the control circuit CTL outputs the control signal $S_3$ to the receive filter $4_R$, and exerts control so that the receive filter $4_R$ changes to the first bandpass characteristics. In addition, in accordance with the control signal $S_0$, the control circuit CTL outputs the control signal $S_4$ to the receive filter $5_R$, and exerts control so that the receive filter $5_R$ changes to the second bandpass characteristics. The receive filter $4_R$ outputs the radio-frequency receive signal $RF_{R-1}$ from the output terminal 1b. The receive filter $5_R$ outputs the radio-frequency receive signal $RF_{R-2}$ from the output terminal 1c.

Conclusion

As described above, when the radio-frequency transmit signal $RF_T$ passes through the transmit filter $4_T$, the radio-frequency signal receiver/transmitter circuit 1 causes the receive filter $4_R$ to change to the first bandpass characteristics. In contrast, when the radio-frequency transmit signal $RF_T$ does not pass through the transmit filter $4_T$, the radio-frequency signal receiver/transmitter circuit 1 causes the receive filter $4_R$ to change to the second bandpass characteristics in which the attenuation is relatively less than that in the first bandpass characteristics.

Thus, when the radio-frequency transmit signal $RF_T$ does not pass through the transmit filter $4_T$, the radio-frequency signal receiver/transmitter circuit 1 enables the attenuation of the radio-frequency receive signal $RF_{R-1}$ to be reduced, and may improve the signal level of the radio-frequency receive signal $RF_{R-1}$. This enables the radio-frequency signal receiver/transmitter circuit 1 to improve the receiver sensitivity of the radio-frequency receive signal $RF_{R-1}$.

Similarly, when the radio-frequency transmit signal $RF_T$ passes through the transmit filter $5_T$, the radio-frequency signal receiver/transmitter circuit 1 causes the receive filter $5_R$ to change to the first bandpass characteristics. In contrast, when the radio-frequency transmit signal $RF_T$ does not pass through the transmit filter $5_T$, the radio-frequency signal receiver/transmitter circuit 1 causes the receive filter $5_R$ to change to the second bandpass characteristics in which the attenuation is relatively less than that in the first bandpass characteristics.

Thus, when the radio-frequency transmit signal $RF_T$ does not pass through the transmit filter $5_T$, the radio-frequency signal receiver/transmitter circuit 1 enables the attenuation of the radio-frequency receive signal $RF_{R-2}$ to be reduced, and may improve the signal level of the radio-frequency receive signal $RF_{R-2}$. This enables the radio-frequency signal receiver/transmitter circuit 1 to improve the receiver sensitivity of the radio-frequency receive signal $RF_{R-2}$.

Second Embodiment

Figure 11:
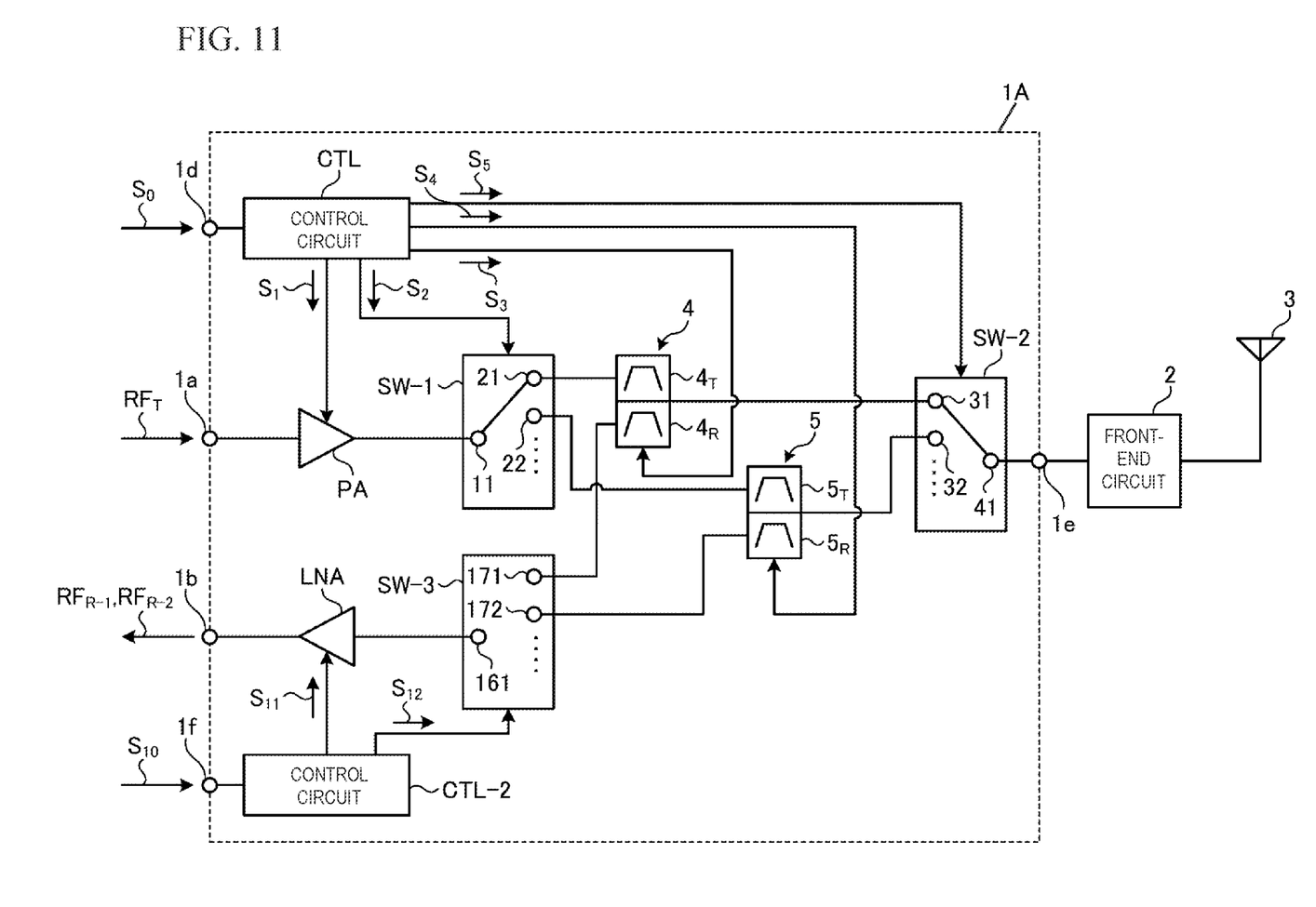
FIG. 11 is a diagram illustrating the configuration of a radio-frequency signal receiver/transmitter circuit according to a second embodiment.

FIG. 11 is a diagram illustrating the configuration of a radio-frequency signal receiver/transmitter circuit according to the second embodiment. Among the components of a radio-frequency signal receiver/transmitter circuit 1A, components identical to those of the radio-frequency signal receiver/transmitter circuit 1 according to the first embodiment are designated with identical reference characters, and will not be described.

Compared with the radio-frequency signal receiver/transmitter circuit 1 (see FIG. 1), the radio-frequency signal receiver/transmitter circuit 1A further includes a low noise amplifier LNA, a switch SW-3, and a control circuit CTL-2.

In the second embodiment, the number of low noise amplifiers is one. However, the present disclosure is not limited to this. Two or more low noise amplifiers may be used.

The switch SW-3 includes a first terminal 161 and second terminals 171, 172, etc. When two or more low noise amplifiers are used, the switch SW-3 includes two or more first terminals.

The second terminal 171 of the switch SW-3 is electrically connected to the first end of the receive filter $4_R$. The second terminal 172 of the switch SW-3 is electrically connected to the first end of the receive filter $5_R$. The first terminal 161 of the switch SW-3 is electrically connected to the input terminal of the low noise amplifier LNA. The output terminal of the low noise amplifier LNA is electrically connected to the output terminal 1b.

The control circuit CTL-2 receives a control signal $S_{10}$ through an input terminal 1f. In accordance with the control signal $S_{10}$, the control circuit CTL-2 outputs, for control, control signals $S_{11}$ and $S_{12}$ to the low noise amplifier LNA and the switch SW-3, respectively. The control signals $S_{10}$ to $S_{12}$ may be one-bit width or multiple-bit width digital signals or may be analog signal (currents or voltages).

In accordance with the control signal $S_{10}$, the control circuit CTL-2 controls the switch SW-3 so that the first terminal 161 is electrically connected to the second terminal 171, and exerts control so that the low noise amplifier LNA operates. Then, the radio-frequency receive signal $RF_{R-1}$ is output from the output terminal 1b.

In accordance with the control signal $S_{10}$, the control circuit CTL-2 controls the switch SW-3 so that the first terminal 161 is electrically connected to the second terminal 172, and exerts control so that the low noise amplifier LNA operates. Then, the radio-frequency receive signal $RF_{R-2}$ is output from the output terminal 1b.

The radio-frequency signal receiver/transmitter circuit 1A, which includes the low noise amplifier LNA, eliminates necessity of a substrate for mounting the low noise amplifier LNA. Thus, the radio-frequency signal receiver/transmitter circuit 1A achieves a reduction in size of the circuit and suppression of the cost.

The embodiments described above are described to facilitate understanding of the present disclosure, not for limited interpretation of the present disclosure. The present disclosure may be changed/improved without necessarily departing from the gist of the present disclosure. In addition, the present disclosure also encompasses the equivalents.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A radio-frequency signal receiver/transmitter circuit comprising:
   a power amplifying circuit configured to amplify a radio-frequency transmit signal;
   at least one duplexer comprising:
      a transmit filter configured to pass the radio-frequency transmit signal, and
      a receive filter configured to switch between first bandpass characteristics and second bandpass characteristics and configured to pass a radio-frequency receive signal, an attenuation level for the second bandpass characteristics being less than an attenuation level for the first bandpass characteristics;
   a switch configured to electrically connect the power amplifying circuit to the transmit filter; and
   a control circuit configured to control whether the power amplifying circuit performs amplification, to control connection of the switch, and to control whether the receive filter operates with the first bandpass characteristics or the second bandpass characteristics,
   wherein when the radio-frequency transmit signal does not pass through the transmit filter, the control circuit is configured to control the receive filter to operate with the second bandpass characteristics.

2. The radio-frequency signal receiver/transmitter circuit according to claim 1, wherein when the radio-frequency transmit signal passes through the transmit filter, the control circuit is configured to control the receive filter to operate with the first bandpass characteristics.

3. The radio-frequency signal receiver/transmitter circuit according to claim 1, further comprising:

a second switch configured to electrically connect the at least one duplexer to an input/output terminal, the input/output terminal being connected electrically to an antenna, wherein the control circuit is further configured to control connection of the second switch.

4. The radio-frequency signal receiver/transmitter circuit according to claim 2, further comprising:

a second switch configured to electrically connect the at least one duplexer to an input/output terminal, the input/output terminal being connected electrically to an antenna, wherein the control circuit is further configured to control connection of the second switch.

5. The radio-frequency signal receiver/transmitter circuit according to claim 1, further comprising:

a low noise amplifier configured to amplify a radio-frequency receive signal; and a third switch configured to electrically connect the low noise amplifier to the receive filter.

6. The radio-frequency signal receiver/transmitter circuit according to claim 2, further comprising:

a low noise amplifier configured to amplify a radio-frequency receive signal; and a third switch configured to electrically connect the low noise amplifier to the receive filter.

7. The radio-frequency signal receiver/transmitter circuit according to claim 3, further comprising:

a low noise amplifier configured to amplify a radio-frequency receive signal; and a third switch configured to electrically connect the low noise amplifier to the receive filter.

8. The radio-frequency signal receiver/transmitter circuit according to claim 5, further comprising:

a second control circuit configured to control whether the low noise amplifier performs amplification, and to control connection of the third switch.

9. The radio-frequency signal receiver/transmitter circuit according to claim 6, further comprising:

a second control circuit configured to control whether the low noise amplifier performs amplification, and to control connection of the third switch.

10. The radio-frequency signal receiver/transmitter circuit according to claim 7, further comprising:

a second control circuit configured to control whether the low noise amplifier performs amplification, and to control connection of the third switch.

\* \* \* \* \*

UNITED STATES PATENT AND TRADEMARK OFFICE
CERTIFICATE OF CORRECTION

PATENT NO. : 11,611,368 B2
APPLICATION NO. : 17/453050
DATED : March 21, 2023
INVENTOR(S) : Kazuhiro Ikarashi Page 1 of 1

It is certified that error appears in the above-identified patent and that said Letters Patent is hereby corrected as shown below:

In the Specification

Column 9, Line 45, "$5_3$" should be -- $S_3$ --.

Signed and Sealed this
Second Day of January, 2024

Katherine Kelly Vidal
*Director of the United States Patent and Trademark Office*